United States Patent Office 3,549,737
Patented Dec. 22, 1970

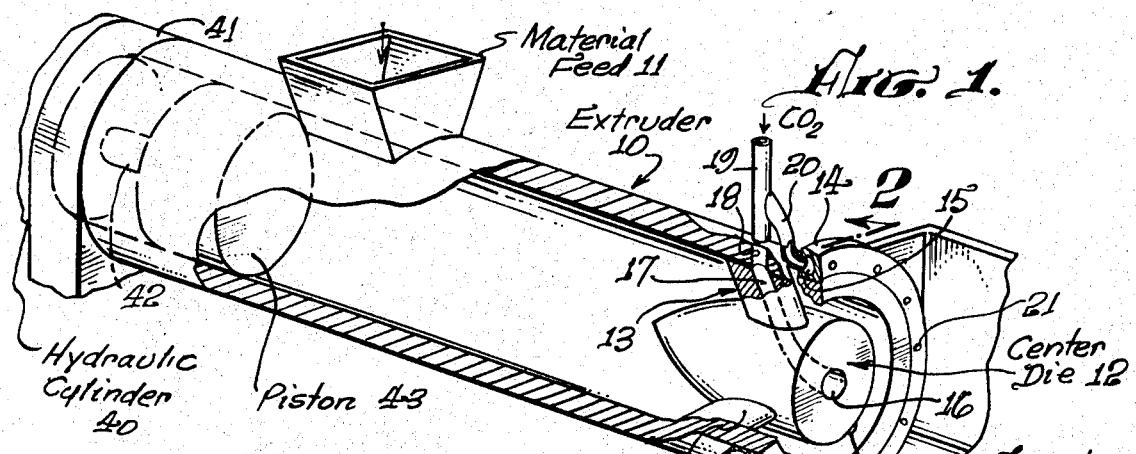

---

3,549,737
FORMING ARTICLES OF ASBESTOS-CEMENT
Herbert C. Schulze, Carlsbad, Calif. (111 El Camino Inn, 3182 Vista Way, Oceanside, Calif. 92054)
Filed Nov. 28, 1967, Ser. No. 686,175
Int. Cl. B28b 21/52; C04b 15/14, 15/11
U.S. Cl. 264—82
4 Claims

ABSTRACT OF THE DISCLOSURE

A process of extruding asbestos-cement pipe wherein carbon dioxide is directed onto the pipe, over the exterior and interior of said pipe as it leaves the extruder to provide an intial hardening. After extrusion the pipe undergoes conventional curing. Hot air and/or low pressure steam can be directed onto the pipe concurrently with the carbon dioxide.

BACKGROUND OF THE INVENTION

(1) Field of the invention

This invention relates generally to the field of curing articles manufactured of asbestos and cement, and in particular, relates to curing of such articles when they have been formed by extrusion methods.

(2) Description of the prior art

It has previously been suggested to cure certain types of articles by using carbon dioxide under various and sundry means. See for example U.S. Pat. No. 3,305,613 and my U.S. Pat. No. 3,356,779 issued Dec. 5, 1967.

SUMMARY OF THE INVENTION

In the extrusion of asbestos cement products the articles extruded are in a very soft and flexible condition, and if they were required to be supported on a form as they frequently are at the present time, the process becomes costly and not properly economical for general use in many instances. The process of the present invention provides a carbon dioxide atmosphere within the interior of hollow extruded shapes and around the exterior of such shapes, or other shapes which may not be hollow to effect initial hardening of the article.

BRIEF DESCRIPTION OF THE DRAWINGS

FIG. 1 is a partially sectional and broken away perspective view of a preferred embodiment of the present invention;

FIG. 2 is a vertical sectional view taken in enlarged scale on line 2—2 of FIG. 1; and FIG. 3 is a partially sectioned, partially broken-away perspective view showing a piece of pipe being extruded by the apparatus of FIGS. 1 and 2.

DESCRIPTION OF THE PREFERRED EMBODIMENTS

In FIG. 1 there is shown an extruder tube 10 having a material feed hopper 11 with a center die 12 being supported in the tube in the usual manner by a "spider" consisting of transverse webs 13, 13a, 13b. A ring 14 is positioned as indicated around the outside of the tube 10 at its extrusion end. The ring 14 is formed with a circumferential passage indicated at 15.

A hole has been provided at 16 in the center die of the extruder 12, and a passageway 17 interconnects therewith through the spider web 13, and further interconnects with a passage through the extruder tube wall at 18. A hose or other duct 19 carries carbon dioxide supply through passageway 17 and hole 16. An associated and connecting hose 20 also carries carbon dioxide to the ring passage 14 and thus allows it to pass through a plurality of axially extending openings 21 formed in the ring 14 in communication with passage 15.

A trough 30 is provided at the discharge end of the extruder tube 10. Carbon dioxide from hole 16 and openings 21 enters such trough and being heavier than air will normally lie within the trough, and thus form a contained atmosphere of carbon dioxide. Additional carbon dioxide may be introduced to trough 30 by a lower opening 31 through conduit 32.

A conventional hydraulic cylinder 40 is disposed at the closed end of tube 10. This cylinder in a manner well known to those skilled in the art is connected to tube 10 by appropriate means 41. A plunger rod 42 connected to a piston 43 is actuated by the hydraulic cylinder and the hydraulic fluid flowing therethrough.

A mixture of asbestos cement material for extrusion is fed through the hopper 11 when the piston 43 is completely retracted. This mixture may comprise Portland cement, asbestos, silica and water. Thereafter, the piston advances and forces the asbestos cement through the extrusion tube 12, and between the tube and the center die 12 to form a pipe 50.

During the extrusion process, carbon dioxide may be fed into and around the extruded pipe 50 by means of openings 21 and/or hole 16, or by merely filling the trough 30 with carbon dioxide. In this manner, the extruded pipe comes immediately into an atmosphere of carbon dioxide upon being extruded. At the same time, it does not become exposed to, nor absorb, the carbon dioxide at any time prior to formation. To subject the pipe to carbon dioxide prior to formation could result in an intial reactive setting, which would then be somewhat destroyed, and the strength of the pipe adversely affected, if the pipe were formed and deformed after the initial reaction of the carbon dioxide. The initial reaction of the carbon dioxide allows the extruded pipe to retain its shape much more quickly and much more safely than if not so treated. After passing from the trough the pipe 50 may be subjected to a complete cure by conventional means.

It should be particularly noted that the carbon dioxide passing into the trough 30 may be heated. Also, low pressure steam or hot air may be added to the carbon dioxide to accelerate the initial hardening of the extruded article.

It should be understood that many other shapes other than pipe, such as flat shapes, angular shapes, or other complex shapes, may be extruded with or without center activities, and in a manner of extrusion well known to those skilled in the art without departing from the scope of the present invention.

I claim:
1. The process of treating tubular articles of asbestos cement comprising:
   extruding tubular articles of asbestos cement;
   subjecting the surfaces of such extruded tubular articles to a carbon dioxide atmosphere immediately after extrusion by concurrently directing carbon dioxide over the exterior and interior of said articles for a period of time thereafter;
   and subsequently submitting said articles to a further curing.
2. The process of claim 1 wherein hot air supplements said carbon dioxide atmosphere.

3. The process of claim 1 wherein steam supplements said carbon dioxide atmosphere.

4. The process of claim 1 in which said articles are subjected to carbon dioxide atmosphere by placing them in a trough filled with carbon dioxide.

References Cited

UNITED STATES PATENTS

| | | | |
|---|---|---|---|
| 1,932,150 | 10/1933 | Tada | 264—82 |
| 2,434,690 | 1/1948 | Ferla | 25—30X |
| 2,877,499 | 3/1959 | Wilkinson | 264—82 |
| 3,353,214 | 11/1967 | Schulze | 25—30X |
| 3,356,779 | 12/1967 | Schulze | 264—333X |
| 3,358,342 | 12/1667 | Spence | 264—82X |
| 3,299,192 | 1/1967 | Lux | 264—53X |
| 3,387,330 | 6/1968 | Lemelson | 264—167X |
| 3,393,261 | 7/1968 | Herzig et al. | 264—82 |

ROBERT F. WHITE, Primary Examiner

J. R. THURLOW, Assistant Examiner

U.S. Cl. X.R.

25—30, 126; 106—315; 264—209, 236, 333